United States Patent
Quigley et al.

(10) Patent No.: US 8,619,730 B2
(45) Date of Patent: Dec. 31, 2013

(54) METHOD AND SYSTEM FOR ESTABLISHING A CONNECTION OUTSIDE A MESH BY INCLUDING NETWORK CONNECTIVITY INFORMATION IN ROUTER CONFIGURATION MESSAGES

(75) Inventors: Thomas Quigley, Franklin, NC (US); Alexander G. MacInnis, Ann Arbor, MI (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1101 days.

(21) Appl. No.: 11/968,583

(22) Filed: Jan. 2, 2008

(65) Prior Publication Data
US 2009/0022122 A1    Jan. 22, 2009

Related U.S. Application Data

(60) Provisional application No. 60/950,975, filed on Jul. 20, 2007.

(51) Int. Cl.
*H04W 80/04*    (2009.01)
*H04W 84/12*    (2009.01)
*H04W 36/18*    (2009.01)

(52) U.S. Cl.
USPC ............ 370/338; 370/328; 370/331; 370/352

(58) Field of Classification Search
USPC .......................................................... 370/338
See application file for complete search history.

(56) References Cited

U.S. PATENT DOCUMENTS

| | | | |
|---|---|---|---|
| 6,072,784 A * | 6/2000 | Agrawal et al. | 370/311 |
| 6,456,858 B1 * | 9/2002 | Streter | 370/331 |
| 6,631,116 B1 | 10/2003 | Eneroth et al. | |
| 6,845,091 B2 * | 1/2005 | Ogier et al. | 370/338 |
| 6,928,282 B2 * | 8/2005 | Taniguchi | 370/331 |
| 7,031,288 B2 * | 4/2006 | Ogier | 370/338 |
| 7,142,524 B2 * | 11/2006 | Stanforth et al. | 370/328 |
| 7,190,678 B2 * | 3/2007 | Thubert et al. | 370/254 |
| 7,236,786 B2 * | 6/2007 | Shen et al. | 370/331 |

(Continued)

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.

(Continued)

*Primary Examiner* — Ian N Moore
*Assistant Examiner* — Jenee Alexander
(74) *Attorney, Agent, or Firm* — Thomas | Horstemeyer, LLP (57) ABSTRACT

A Wireless mobile communication (WMC) device may maintain user preference information, which is unique to the WMC device capabilities and the device user. WMC devices located in near proximity of each other may be enabled to form an ad hoc wireless network wherein each WMC device within the network may function as a router for other devices. Utilizing such routing capability within an ad hoc wireless network may allow WMC devices that are out of their wireless coverage area to use other WMC devices within such ad hoc wireless network to route any impending communication through such other WMC devices wherein these devices may have wireless connectivity to their coverage networks. WMC devices that are may have external connectivity may be enable to be selective in routing information and/or data from other WMC devices in the ad hoc network.

30 Claims, 8 Drawing Sheets

(56) References Cited

U.S. PATENT DOCUMENTS

| | | | |
|---|---|---|---|
| 7,295,528 B2 * | 11/2007 | Ibrahim et al. | 370/328 |
| 7,324,476 B2 * | 1/2008 | Agrawal et al. | 370/338 |
| 7,327,683 B2 * | 2/2008 | Ogier et al. | 370/338 |
| 7,366,111 B2 * | 4/2008 | Thubert et al. | 370/328 |
| 7,386,275 B2 | 6/2008 | Pirzada et al. | |
| 7,522,518 B1 * | 4/2009 | Satapathy | 370/338 |
| 7,551,634 B2 * | 6/2009 | Nabae | 370/408 |
| 7,606,570 B2 | 10/2009 | Karaoguz et al. | |
| 7,620,065 B2 * | 11/2009 | Falardeau | 370/465 |
| 7,627,290 B2 * | 12/2009 | Wing et al. | 370/238 |
| 7,636,362 B2 * | 12/2009 | Singh et al. | 370/395.42 |
| 7,649,852 B2 * | 1/2010 | Thubert et al. | 370/310 |
| 7,729,708 B2 | 6/2010 | Jung et al. | |
| 7,733,818 B2 * | 6/2010 | Twitchell, Jr. | 370/338 |
| 7,761,607 B2 | 7/2010 | Hassan et al. | |
| 7,801,058 B2 | 9/2010 | Wang | |
| 7,801,099 B2 * | 9/2010 | Desai | 370/338 |
| 7,822,023 B2 * | 10/2010 | Lahetkangas et al. | 370/389 |
| 7,873,019 B2 | 1/2011 | Dawson et al. | |
| 7,894,470 B2 | 2/2011 | Ruckart | |
| 8,005,465 B2 | 8/2011 | Salokannel et al. | |
| 2002/0012320 A1 * | 1/2002 | Ogier et al. | 370/252 |
| 2003/0099221 A1 * | 5/2003 | Rhee | 370/338 |
| 2004/0008663 A1 * | 1/2004 | Srikrishna et al. | 370/351 |
| 2004/0081166 A1 * | 4/2004 | Stanforth et al. | 370/310 |
| 2005/0243835 A1 * | 11/2005 | Sharma et al. | 370/395.42 |
| 2005/0286466 A1 | 12/2005 | Tagg et al. | |
| 2006/0055529 A1 * | 3/2006 | Ratiu et al. | 370/229 |
| 2006/0171308 A1 * | 8/2006 | Jung et al. | 370/229 |
| 2007/0019670 A1 * | 1/2007 | Falardeau | 370/465 |
| 2007/0030824 A1 | 2/2007 | Ribaudo et al. | |
| 2007/0032225 A1 | 2/2007 | Konicek et al. | |
| 2007/0047478 A1 * | 3/2007 | Balachandran et al. | 370/328 |
| 2007/0104168 A1 * | 5/2007 | Polson | 370/338 |
| 2007/0274275 A1 * | 11/2007 | Laroia et al. | 370/338 |
| 2007/0291714 A1 * | 12/2007 | Laroia et al. | 370/338 |
| 2008/0019339 A1 | 1/2008 | Raju et al. | |
| 2008/0031169 A1 | 2/2008 | Shi et al. | |
| 2008/0056215 A1 | 3/2008 | Kopikare et al. | |
| 2008/0076419 A1 * | 3/2008 | Khetawat et al. | 370/328 |
| 2008/0240048 A1 | 10/2008 | Okker et al. | |
| 2008/0291855 A1 | 11/2008 | Bata et al. | |
| 2008/0310346 A1 * | 12/2008 | Rich et al. | 370/328 |
| 2008/0311896 A1 | 12/2008 | Karaoguz et al. | |
| 2008/0316997 A1 * | 12/2008 | Zeng et al. | 370/351 |
| 2009/0022122 A1 * | 1/2009 | Quigley et al. | 370/338 |
| 2010/0177703 A1 | 7/2010 | daCosta et al. | |

OTHER PUBLICATIONS

Seagate Technology LLC, Seagate D.A.V.E. (Digital Audio Video Experience) The portable storage platform that collects, plays and manages digital content, Product Overview, 2007.

* cited by examiner

METHOD AND SYSTEM FOR ESTABLISHING A CONNECTION OUTSIDE A MESH BY INCLUDING NETWORK CONNECTIVITY INFORMATION IN ROUTER CONFIGURATION MESSAGES

CROSS-REFERENCE TO RELATED APPLICATIONS/INCORPORATION BY REFERENCE

This patent application makes reference to, claims priority to and claims benefit from U.S. Provisional Application Ser. No. 60/950,975 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for establishing a connection outside a mesh by including network connectivity information in router configuration messages.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intend to add an element of mobility to the traditional telephony service, this technology has grown beyond that initial purpose. Many modern cellular technologies, including such technologies as GSM/GPRS, UMTS, and CDMA2000, incorporate substantial data capabilities. Most of today's cellular services include such features as text messaging, video streaming, web browsing . . . etc.

Combining various wireless technologies is another trend in the wireless world. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Devices aimed at taking advantage of the capabilities of wireless networks can be described as Wireless mobile communication (WMC) devices. Today's WMC devices may comprise such devices as cellular phones, PDA's, laptops, and/or other devices.

One of the issues that tends to rise with the use of WMC devices is the availability of wireless connectivity. Because WMC devices are typically aimed at use-on-the-move, a WMC device, due to its user's movement, may locate outside the of wireless connectivity coverage area. For example, with such devices as mobile phones, it is not unusual for a user to drive out of cellular networks coverage area, especially when driving between towns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for establishing a connection outside a mesh by including network connectivity information in router configuration messages, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for establishing a connection outside a mesh by including network connectivity information in router configuration messages. WMC devices may be enabled to communicate directly with other WMC devices that may be located in near proximity; allowing WMC devices to form peer-to-peer connectivity. WMC devices' peer-to-peer communication may be device-specific and thus limited to a narrow class of devices based on type and/or make. Alternatively, WMC devices' peer-to-peer connectivity may also be based on a standardized wireless connectivity interface, for example Bluetooth®. Such WMC devices peer-to-peer connectivity may be utilized to form an ad hoc wireless network wherein each WMC device within the network may function as a router for other devices. Utilizing such routing capability within an ad hoc wireless network may allow WMC devices that are out of their wireless coverage area to use other WMC devices within such ad hoc wireless network to route any impending communication through such other WMC devices wherein these devices may have wireless connectivity to their coverage networks.

Figure 1:
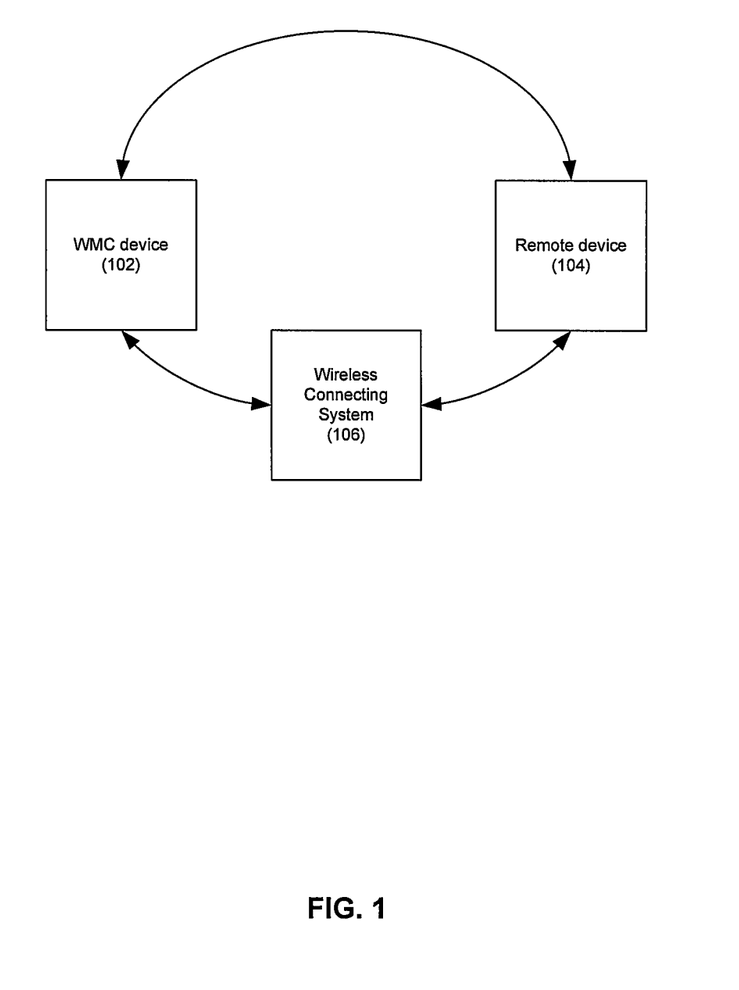
FIG. 1 is a block diagram that illustrates an exemplary communication setup between a wireless mobile communication (WMC) device and a remote device, which may be utilized in accordance with an embodiment of the invention.

FIG. 1 is a block diagram that illustrates an exemplary communication setup between a wireless mobile communication (WMC) device and a remote device, which may be utilized in accordance with an embodiment of the invention. Referring to FIG. 1, there is shown the Wireless mobile communication (WMC) device 102, the remote device 104, and a connecting system 106.

The WMC device 102 may comprise suitable hardware, logic, circuitry and/or code that may enable performing wireless mobile communication. For example, the WMC device 102 may be utilized to perform voice, video and/or text message peer-to-peer communication. The WMC device 102 may also perform additional functionality including, but not limited to, internet browsing, video streaming . . . etc.

The remote device 104 may comprise suitable hardware, logic, circuitry and/or code that may be enabled to communicate to with the WMC device 102. The invention may not be limited to a specific remote device, but may comprise for example, a general purpose processing device, a specialized processing device, a specialized peripheral device, or any combination of suitable hardware, firmware, software and/or code, which may be enabled to perform a job requested by the WMC device 102. For example, the remote device may comprise a home PC that may comprise fast processing subsystems and increased memory space. Such home PC may be better suited to perform processing and/or storage intensive tasks. For instance, where necessary and/or feasible, the WMC device 102 may utilize the remote device 104 to perform Internet searches and/or for secure storage of data that may be created and/or maintained in the WMC device 102.

The connecting system 106 may comprise a plurality of interconnecting networks and suitable hardware, logic, circuitry and/or code that may be enabled to facilitate end-to-end communication between the WMC device 102 and the remote device 104. The connecting system 106 may comprise wireless and/or wired networks that may be enabled to communicate and forward messaging and/or data between the WMC device 102 and the remote device 104.

In operation, the WMC device 102 may communicate directly with the remote device 104 if the devices were enabled to communicate directly, or the WMC device may communicate with the remote device 104 through the connecting system 106.

Figure 2A:
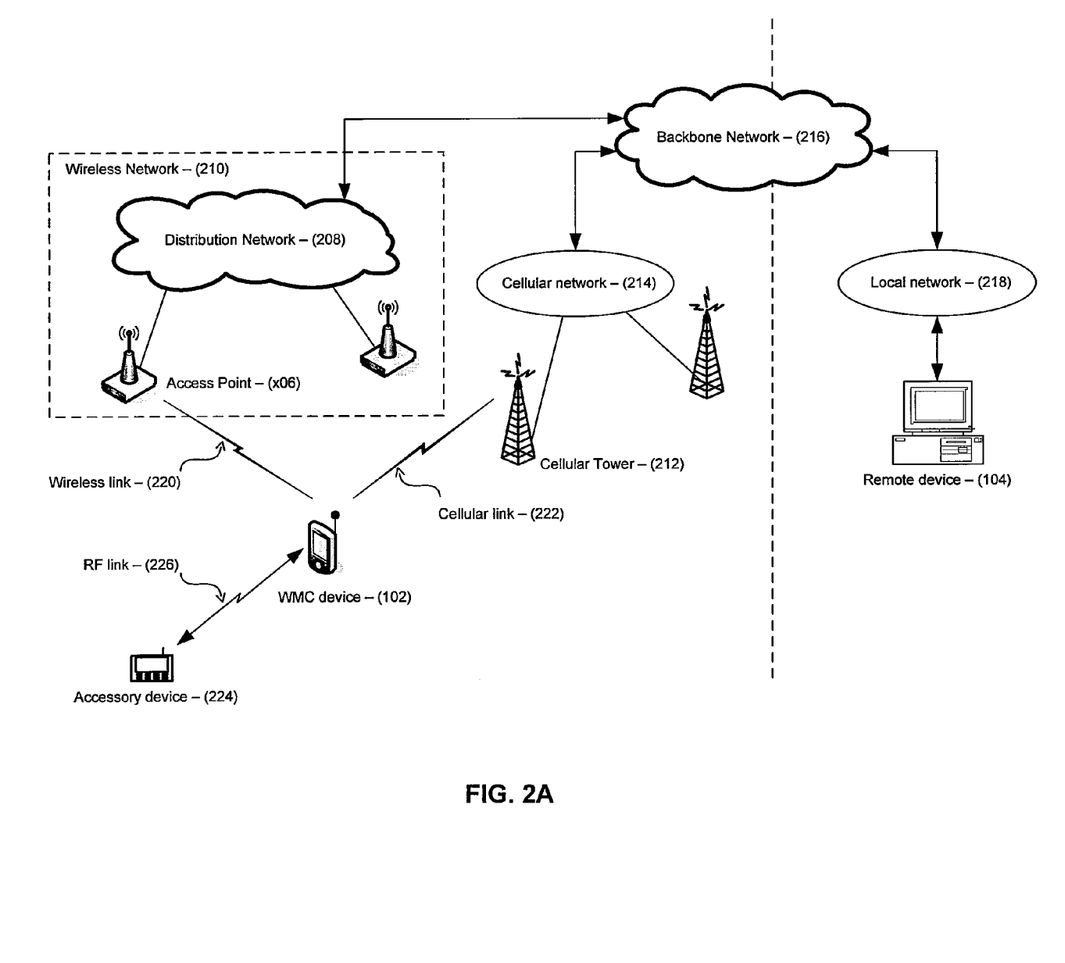
FIG. 2A is a block diagram that illustrates an exemplary model for setup that includes a wireless mobile communication (WMC) device and a remote device, which may be utilized in accordance with an embodiment of the invention.

FIG. 2A is a block diagram that illustrates an exemplary model for setup that includes a wireless mobile communication (WMC) device and a remote device, which may be utilized in accordance with an embodiment of the invention. Referring to FIG. 2A, there is shown the WMC device 102, the remote device 104, an access point 206, a distribution network 208, a wireless network 210, a cellular tower 212, a cellular network 214, a backbone network 216, a local network 218, a wireless link 220, a cellular link 222, an accessory device 224, and a RF link 226.

The wireless network 210 may comprise a plurality of the access point 206, the distribution network 208 and suitable hardware, logic, circuitry and/or code that may enable implementing a functional block corresponding to a wireless technology. Exemplary wireless technology may comprise for example the IEEE 802.11 (WLAN) or WiMax (802.16) architecture. The access point 206 may comprise suitable hardware, logic, circuitry, and/or code that may be utilized as access point necessary for the WMC device 102 to access the wireless network 210. The distribution network 208 may comprise suitable hardware, logic, circuitry, and/or code that may be adapted to operate as a backbone network that may be responsible for transport and link functionality for plurality of access points in the wireless network 210.

The cellular network 214 may comprise plurality of the cellular tower 212, and suitable hardware, logic, circuitry and/or code that may enable implementing a functional block corresponding to a cellular technology. Exemplary cellular technology may comprise cellular technologies that enable data services, including but not limited to, CDMA, WCDMA, CDMA2000, HSDPA, GSM, GPRS, EDGE, and UMTS.

The accessory device 224 may comprise suitable hardware, logic, circuitry and/or code that may enable performing some accessory functionality in conjunction with the use of the WMC device 102. For example, the accessory device may comprise a hands-free headset. The WMC device 102 may interact with the accessory device 224 over a short-range RF link 226. The RF link 226 may be based on a standardized technology for inter-device short range communication. For example, the RF link may correspond to a Bluetooth® connection or Zigbee connection between the accessory device 224 and the WMC device 102.

The local network 218 may comprise suitable hardware, logic, circuitry and/or code that may enable local connectivity. This local connectivity may comprise use of Local Area Network (LAN) technologies that enable data services, including but not limited to, IEEE 802.3 Ethernet.

The backbone network 216 may comprise suitable hardware, logic, circuitry, and/or code that may be adapted to provide overall system connectivity between sub-networks. The wired network 216 may be enabled to interact with, and connect different wired and wireless technologies. For example, the backbone network may comprise a standard telephony network that may enable data connectivity between different interface nodes linking wired and/or wireless networks comprising WLAN networks, WiMax networks, cellular networks, and/or LAN networks.

In operation, the WMC device 102 may utilize a wireless link 220 to access the wireless network 210 via the access point 206. The WMC device 102 may also utilize the cellular link 222 to access the cellular network 214 via the cellular tower 212. The WMC device 102 may attempt to communicate with the remote device 104 via the wireless network 210 through the access point 206 and the distribution network 208. The distribution network 208 may enable forwarding messaging and/or data sent from, and to the WMC device 102. The backbone network 216 enables connectivity between local networks, for example wireless network 210, and cellular network 214. The remote device 104 may receive communication from the WMC device 102 by interacting with the backbone network 216. Necessary protocol-based operations may be performed to facilitate the transmission of information through all the different components. This may comprise use of such protocols as IP, SS7 . . . etc.

Figure 2B:
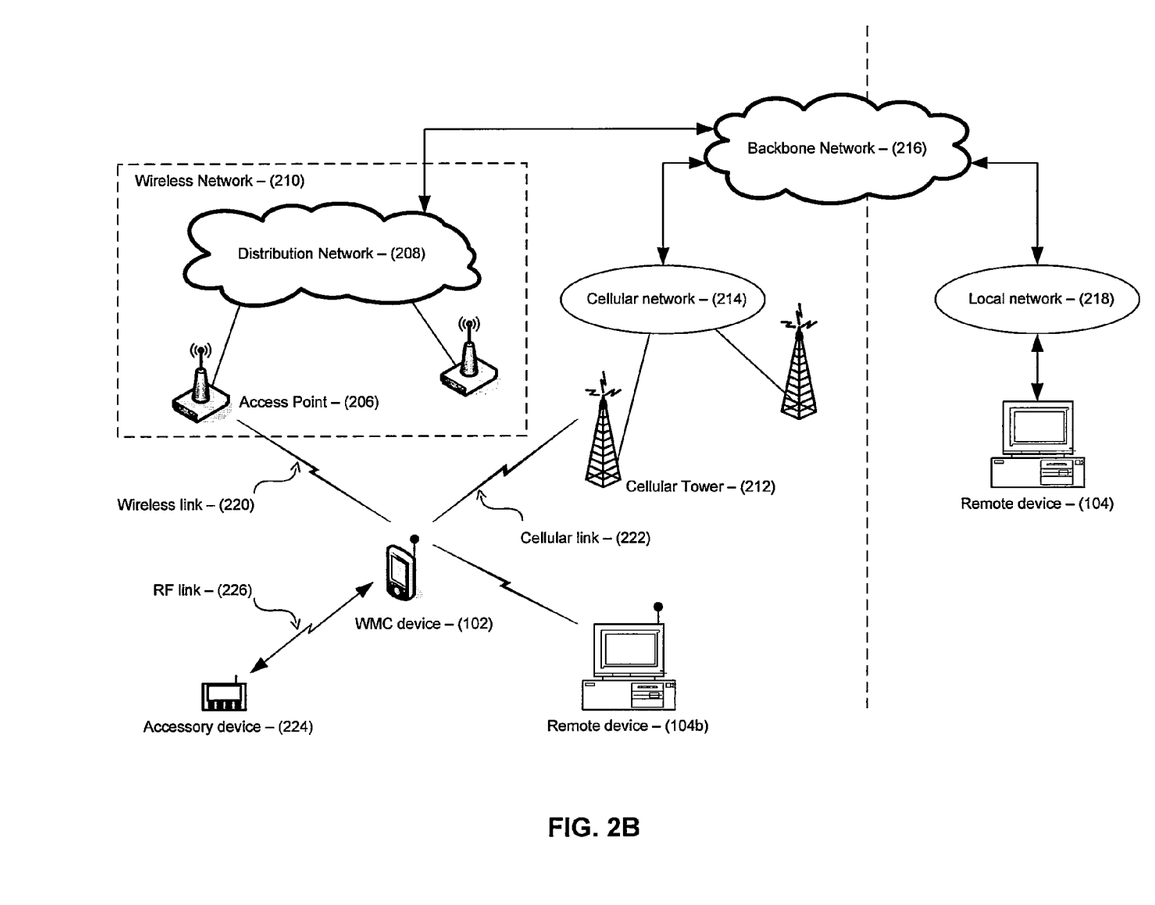
FIG. 2B is a block diagram that illustrates an exemplary model for setup that includes a wireless mobile communication (WMC) device communicating directly via a wireless connection with a remote device, which may be utilized in accordance with an embodiment of the invention.

FIG. 2B is a block diagram that illustrates an exemplary model for setup that includes a wireless mobile communication (WMC) device communicating directly via a wireless connection with a remote device, which may be utilized in accordance with an embodiment of the invention. Referring to FIG. 2B, there is shown the WMC device 102, the remote device 104, the access point 206, the distribution network 208, the wireless network 210, the cellular tower 212, the cellular network 214, the backbone network 216, the accessory device 224, the RF link 226, and a remote device 104b.

The remote device 104b may be comprised similar to the remote device 104; however, the remote device 104b may also comprise suitable hardware, logic, circuitry, and/or code that may enable wireless connectivity.

In operation, the remote device 104b operates similar to the remote device 104; however, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102 because the characteristics of the wireless connection between the remote device 104b and the WMC device 102 may be the only external factor impacting the setup outside of the internal capabilities of both limitations compared to setups where the WMC device may have to communicate with the remote device 104 through plurality of connecting networks and/or entities.

Figure 3:
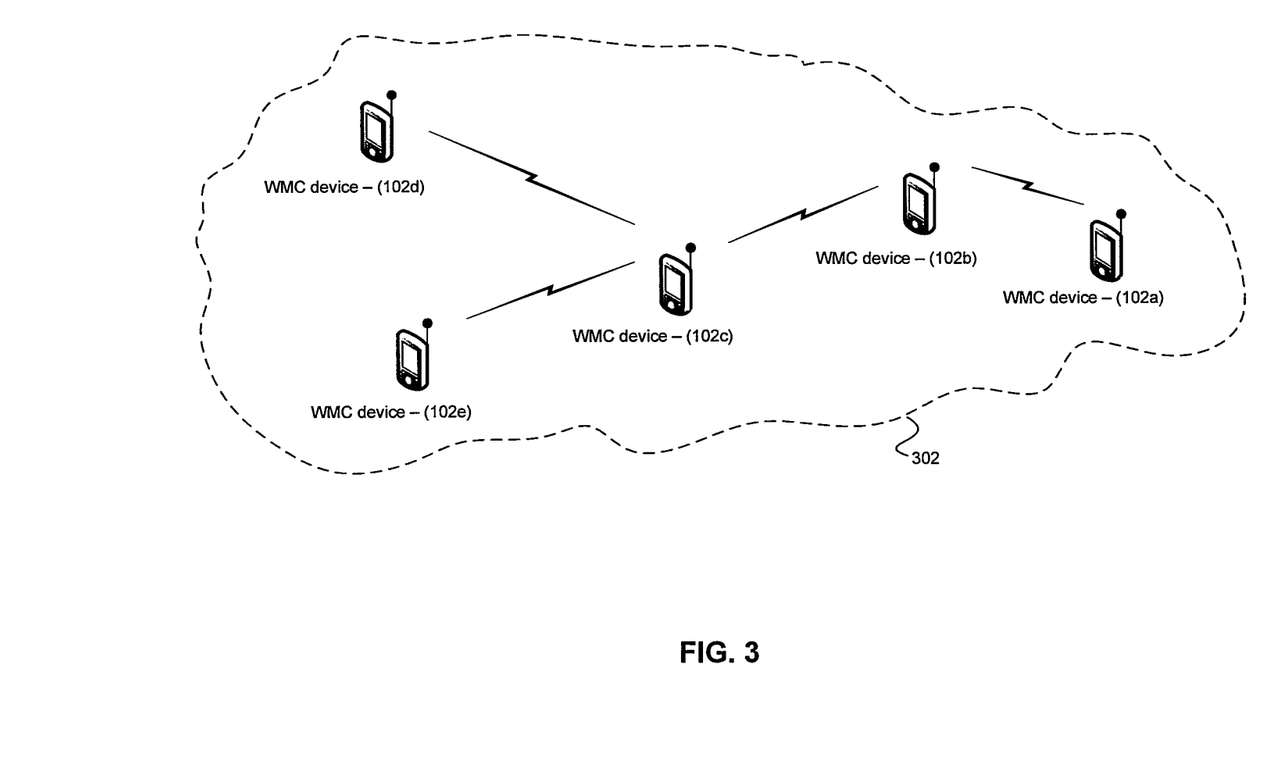
FIG. 3 is a block diagram that illustrates plurality of WMC devices forming a local WMC network, which may be utilized in accordance with an embodiment of the invention.

FIG. 3 is a block diagram that illustrates plurality of WMC devices forming a local WMC network, which may be utilized in accordance with an embodiment of the invention. Referring to FIG. 3, there is shown a WMC mesh network 302, and a plurality of WMC devices 102a, 102b, 102c, 102d, and 102e.

The plurality of WMC devices 102a, 102b, 102c, 102d, and 102e may be substantially similar to the WMC device 102 and may also comprise suitable hardware, logic, circuitry and/or code that may enable device-to-device communication, and generation and broadcasting of routing scheduling data to other WMC devices.

The WMC mesh network 302 may comprise a plurality of WMC devices, and may also comprise suitable hardware, logic, circuitry and/or code that may enable forming mesh-like, ad hoc wireless networks of WMC devices.

In operation, a plurality of WMC devices 102a, 102b, 102c, 102d, and 102e may communicate with each other once the devices are within device-to-device communication range. Each device may serve as a node in a routing-like architecture wherein each node may serve as a router for other nodes in the network. Each device may generate routing scheduling data that may be broadcasted to other WMC devices. The routing scheduling data may comprise data that indicate external network connectivity. The WMC devices 102a, 102b, 102c, 102d, and 102e may each also maintain routing information that may enable each device to ascertain possible routing paths when attempting to communicate with external network(s).

Figure 4A:
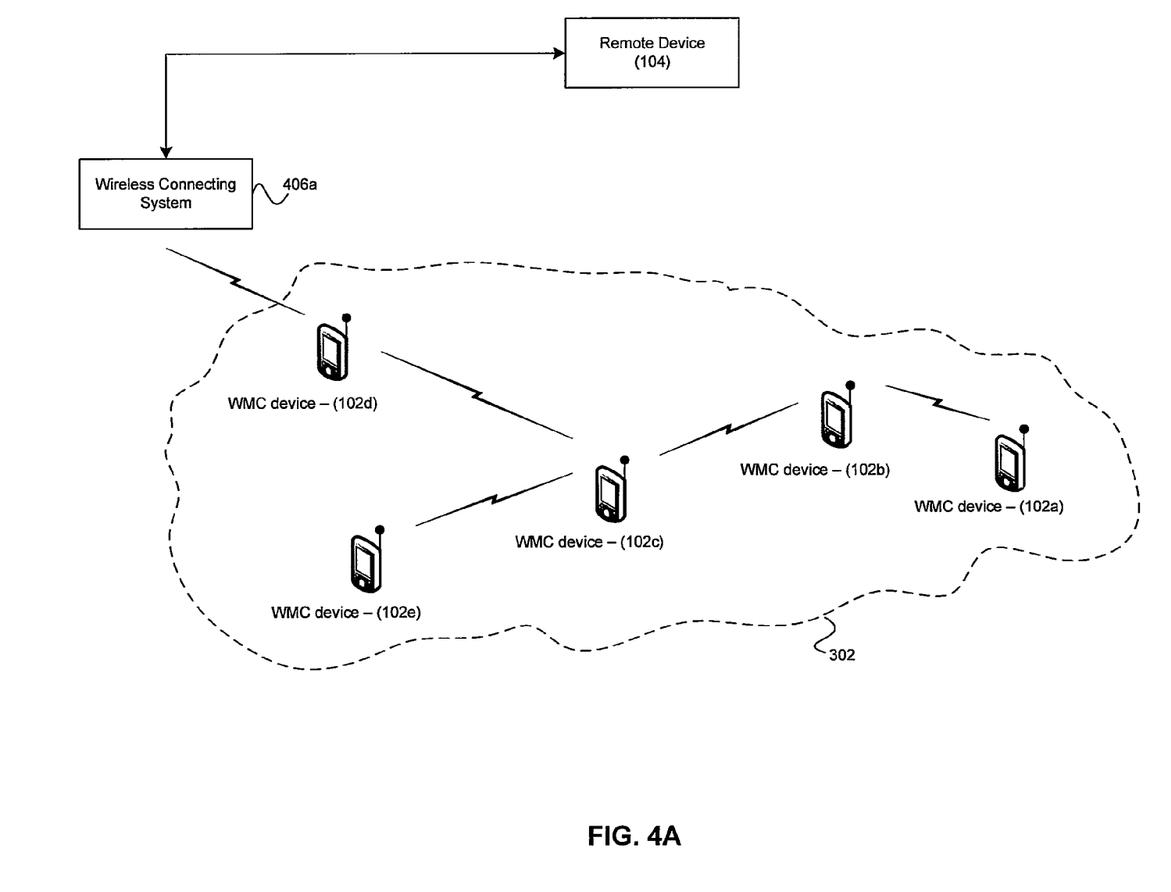
FIG. 4A is a block diagram that illustrates a mesh of WMC devices interacting with wireless connecting system, which may be utilized in accordance with an embodiment of the invention.

FIG. 4A is a block diagram that illustrates a mesh of WMC devices interacting with wireless connecting system, which may be utilized in accordance with an embodiment of the invention. Referring to FIG. 4, there is shown the WMC mesh network 302, the plurality of WMC devices 102a, 102b, 102c, 102d, and 102e, the remote device 104, and a wireless connecting system 406a.

The wireless connecting system 406a may be substantially similar to the connecting system 106, and may comprise a wireless wide area network (WAN). The wireless connecting system 406a may be utilized to enable the WMC device 102d to be communicatively coupled to an external network.

In operation, the WMC device 102d may be enabled to communicate with the wireless connecting system 406a when the WMC device 102d is within access range of the wireless connecting system 406a. Once the WMC device 102d is communicatively coupled to the wireless connecting system 406a, the WMC device 102d may modify and/or updates its routing scheduling data to indicate that the WMC device 102d may be capable of communicating with an external network. The WMC device 102d may broadcast the updated/modified routing scheduling data to the remaining devices in the WMC mesh network 302. Remaining WMC devices may create and/or update routing information based on the broadcasted routing scheduling data. For example, WMC device 102e may update its routing information to indicate that it may have access to external network via WMC devices 102c and 102d. In the instance that WMC device 102e is attempting to access the external network, the WMC device 102e may forwards data and/or information to WMC device 102d via WMC device 102c.

WMC device 102d may be enabled to be selective in forwarding data and/or information communicated between WMC devices in the WMC mesh network 302 and 406a. For example, the WMC device 102d may determine that its connectivity with wireless connecting system 406a may limit data and information that may passed on behalf of other WMC devices in the WMC mesh network 302. The WMC device 102d may utilize various criteria for resolving any possible access conflicts. For example, the WMC device 102d may utilized priority based on emergency as a criterion for allowing data and/or information from a WMC device in the local WMC device 302 to go through rather then non-emergency data and/or information when the connection between the WMC device 102d and the connecting system 406a prevent forwarding both the emergency and non-emergency data and/or information.

Figure 4B:
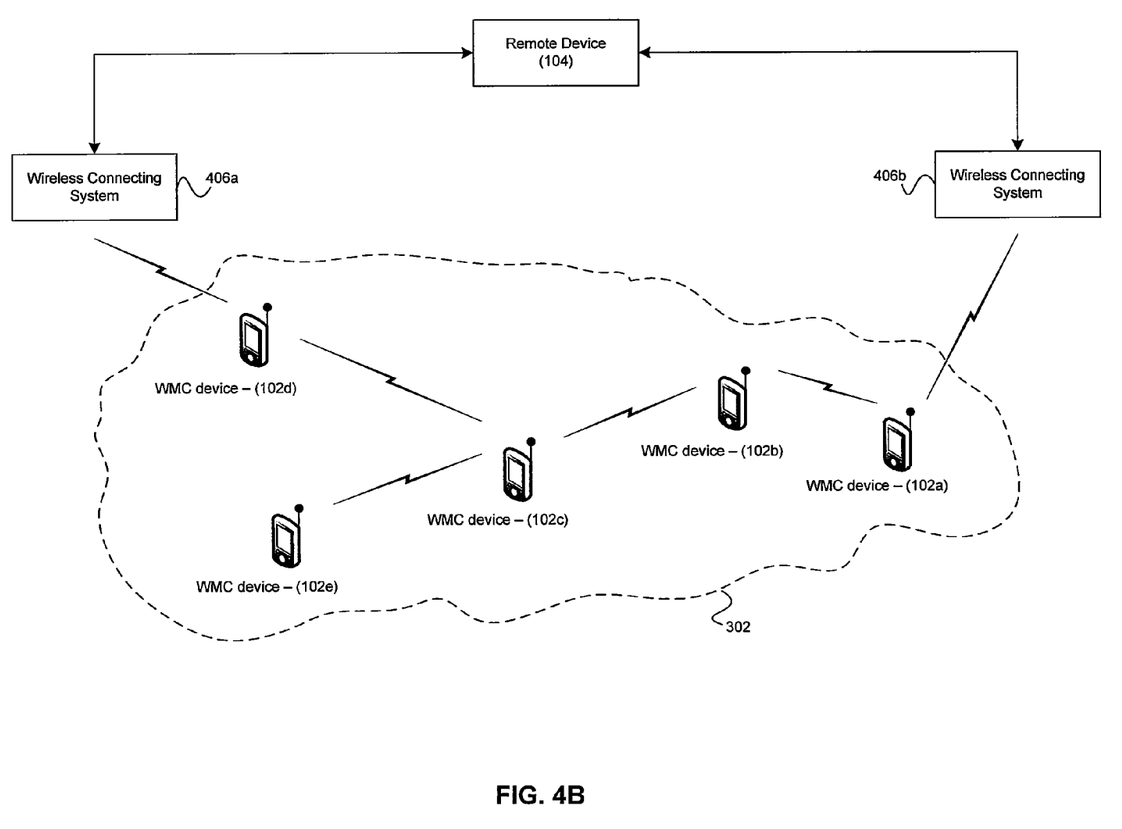
FIG. 4B is a block diagram that illustrates a mesh of WMC devices interacting with multiple wireless connecting systems, which may be utilized in accordance with an embodiment of the invention.

FIG. 4B is a block diagram that illustrates a mesh of WMC devices interacting with multiple wireless connecting systems, which may be utilized in accordance with an embodiment of the invention. Referring to FIG. 4B, there is shown the WMC mesh network 302, the plurality of WMC devices 102a, 102b, 102c, 102d, and 102e, the remote device 104, the wireless connecting system 406a, and a wireless connecting system 406b.

The wireless connecting system 406b may be substantially similar to the connecting system 406a. The wireless connecting system 406b may be utilized to enable the WMC device 102a to be communicatively coupled to an external network.

In operation, the WMC device 102*d* may be enabled to communicate with the wireless connecting system 406*a* when the WMC device 102*d* is within access range of the wireless connecting system 406*a*. The WMC device 102*a* may be enabled to communicate with the wireless connecting system 406*b* when the WMC device 102*a* is within access range of the wireless connecting system 406*b*. Once the WMC device 102*d* is communicatively coupled to the wireless connecting system 406*a*, the WMC device 102*d* may modify and/or updates its routing scheduling data to indicate that the WMC device 102*d* may be capable of communicating with an external network. The WMC device 102*d* may broadcast the updated/modified routing scheduling data to the remaining devices in the WMC mesh network 302. Similarly, the WMC device 102*a* may be update/create its routing scheduling data to indicate that it has external connectivity and broadcast the routing scheduling data to remaining devices in the WMC mesh network 302. Remaining WMC devices may create and/or update routing information based on the broadcasted routing scheduling data from devices 102*d* and 102*a*. For example, WMC device 102*e* may update its routing information to indicate that it may have access to external network via WMC devices 102*c* and 102*d* or via WMC devices 102*c*, 102*b*, and 102*a*. In the instance that WMC device 102*e* is attempting to access the external network, the WMC device 102*e* may forward data and/or information to WMC device 102*d* via WMC device 102*c* and/or to WMC devices 102*a* via WMC devices 102*c* and 102*b*.

The WMC device 102*d* may be enabled to be selective in forwarding data and/or information communicated between WMC devices in the WMC mesh network 302 and 406*a* substantially as described in FIG. 4A. The WMC device 102*a* may also be selective in forwarding and/or information communicated between WMC devices in the WMC mesh network 302 and 406*b*, and may perform substantially similar to the WMC device 102*d* as described in FIG. 4A.

Figure 5A:
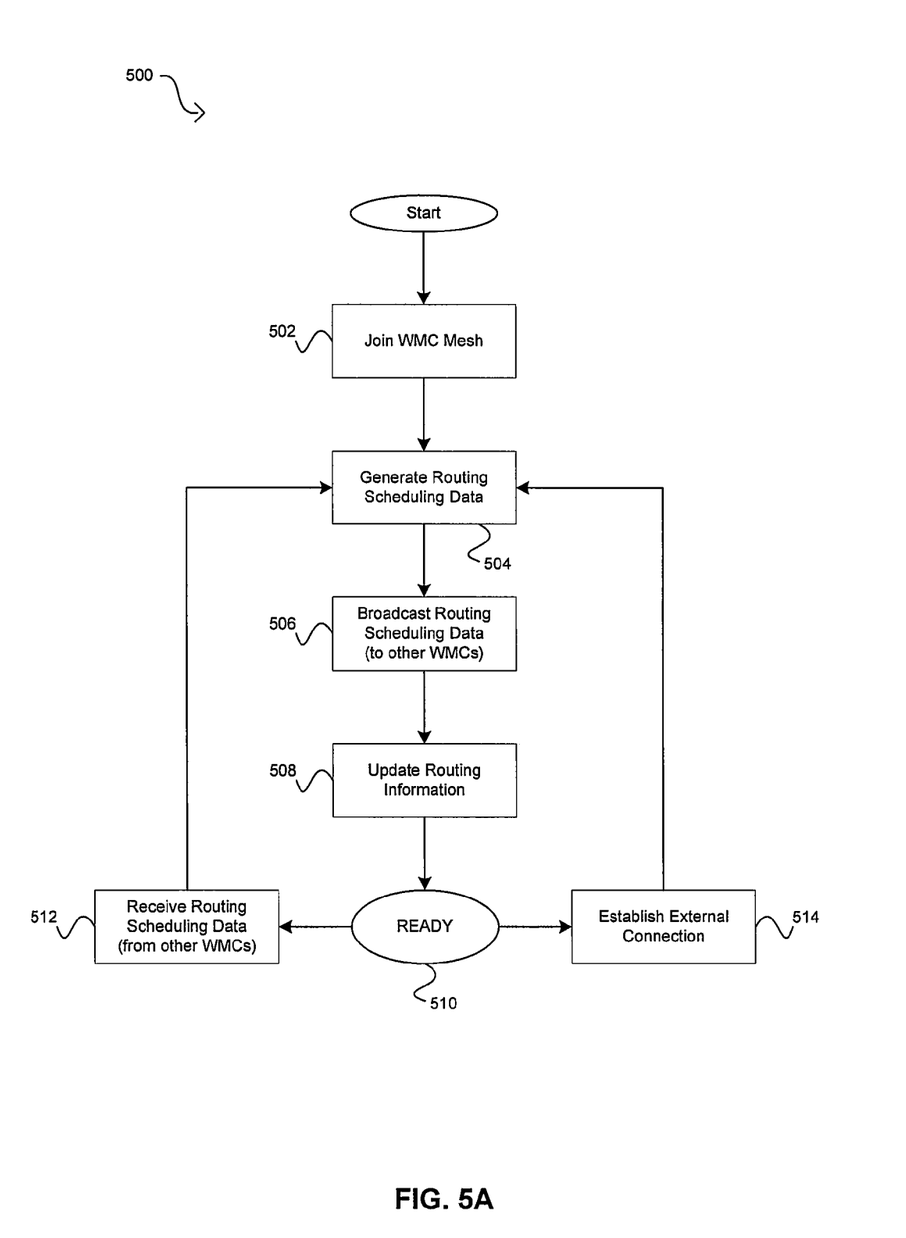
FIG. 5A is a flow chart that illustrates WMC device joining a mesh, which may be utilized in accordance with an embodiment of the invention.

FIG. 5A is a flow chart that illustrates WMC device joining a mesh, which may be utilized in accordance with an embodiment of the invention. Referring to FIG. 5A, there is shown flow chart 500. The flow chart may start when a WMC device comes into near proximity of other WMC devices forming a mesh, substantially similar to the mesh described in FIG. 3. In step 502, the WMC device may join the mesh. The WMC device may utilize specific device-to-device protocol and/or standard-based communication interface to interact with other WMC devices forming a WMC mesh. For example, WMC device may utilize Bluetooth® standard in peer-to-peer communications to form a WMC mesh. In step 504, the WMC device may generate routing scheduling data. The WMC device may include in the routing scheduling data any present connection with external networks that the WMC device may be communicatively coupled to at the time. In step 506, the WMC device may broadcast the generated routing scheduling data to other WMC devices in the WMC mesh. In step 508, the WMC may update its routing information. This may comprise utilizing direct and/or indirect access to external network (via other WMC devices in the WMC mesh). In step 510, the WMC device is READY, wherein the WMC device is actively participating in the WMC mesh operations and may be capable of routing data and/or message from/to other WMC devices in the mesh network.

While the WMC device is READY, the WMC may receive routing scheduling data from other WMC devices in the WMC mesh and/or experience change of its external network connectivity. In step 512, the WMC device receives routing scheduling data from other WMC devices in the WMC, and the WMC device may proceed to step 504. In step 514, the WMC device detects a change in external network connectivity. This may comprise coming into or moving out of, coverage area of an external network. The process may proceed to step 504.

Figure 5B:
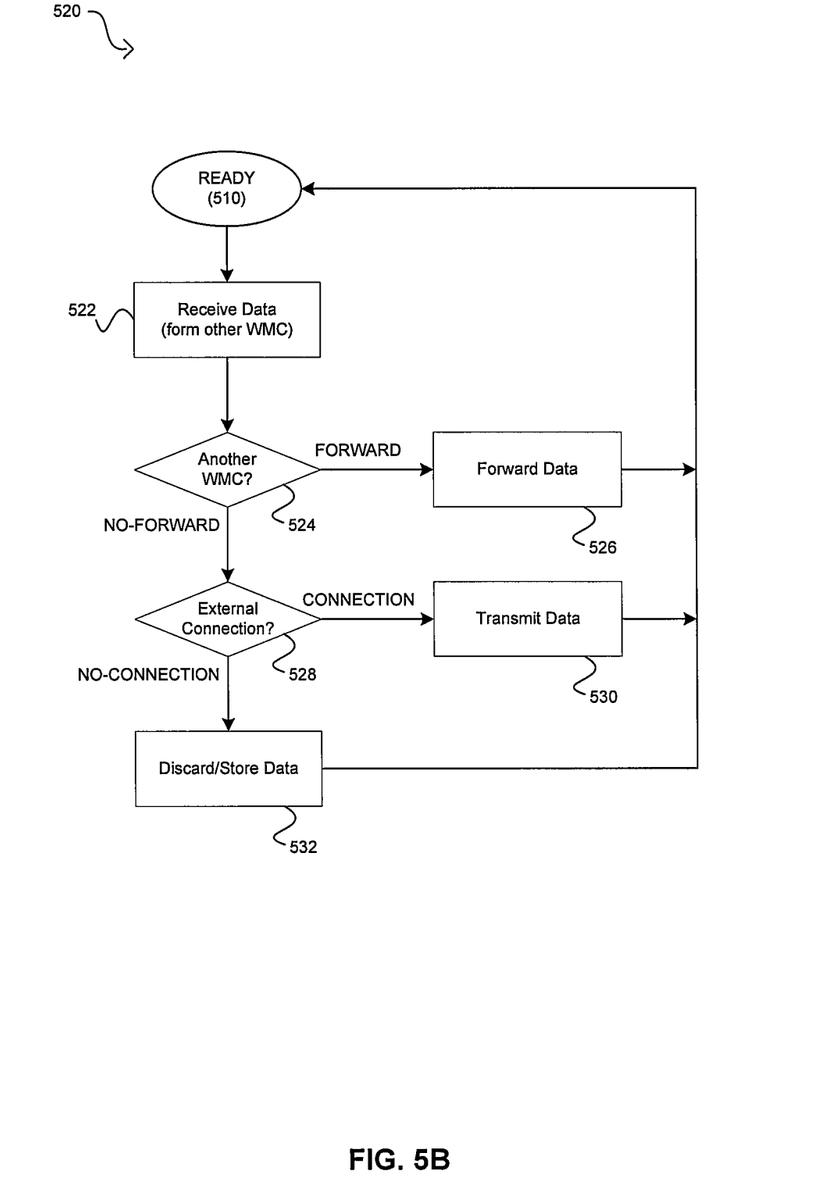
FIG. 5B is a flow chart that illustrates WMC device in mesh handling data from other WMC devices, which may be utilized in accordance with an embodiment of the invention.

FIG. 5B is a flow chart that illustrates WMC device in mesh handling data from other WMC devices, which may be utilized in accordance with an embodiment of the invention. Referring to FIG. 5B, there is shown a flow chart 520. Initially, the WMC device would be participating in a WMC mesh, and in the READY state, as substantially described in FIG. 5A. In step 522, the WMC device receives some data from other WMC device in the WMC mesh. In step 524, the WMC device may determine whether the data is to be forwarded to other WMC devices, or sent through the WMC device to external network(s). In the instance that the outcome of step 524 is FORWARD, wherein the WMC device is only requested to route data and/or message received from WMC devices in the WMC mesh to other WMC devices, the process may proceed to step 526. In step 526, the WMC device forwards the received data to the target WMC devices in the WMC mesh, and return to the READY state.

Returning to step 524, in the instance that the outcome of step 524 is NO-FORWARD, wherein the WMC device is requested to route data and/or message received from WMC devices to an external network, the process may proceed to step 528. In step 528, the WMC device may verify whether it is communicatively coupled to an external network. In the instance that the outcome of the verification in step 528 is CONNECTION, wherein the WMC device is communicatively coupled to an external network, the process may proceed to step 530. In step 530, the WMC device may transmit the received data to the external network, and the WMC device may then return to the READY state.

Returning to step 528, in the instance that the outcome of the verification in step 528 is NO-CONNECTION, wherein the WMC device is not communicatively coupled to an external network, the process may proceed to step 532. In step 532, the WMC device may discard the received data because the WMC device was unable to transmit it to an external network. Alternatively, in another embodiment, the WMC device may store the received Data and then attempt to transmit it whenever the WMC device becomes communicatively coupled to an external network.

In another embodiment of the invention, one or more of the WMC may be configured to operate as a server. In this regard, a WMC configured to operate as a server may control operation of routing within the mesh network and/or external to the mesh network. For example, a WMC configured to operate as a server may have routing functionality and/or DHCP capability Various embodiments of the invention may comprise a method and system for establishing a connection outside a mesh by including network connectivity information in router configuration messages. WMC devices 102*a*, 102*b*, 102*c*, 102*d*, and 102*e* may be enabled to form device-to-device connectivity when they are located in near proximity of each other. These WMC devices' peer-to-peer connectivity may be utilized to form an ad hoc WMC mesh network 302 wherein each WMC device within the network may function as a router for other devices. Utilizing such routing capability within the WMC mesh network 302 may enable WMC devices that may not be connectively coupled to external network to utilize other WMC devices in the WMC mesh network 302 to reach, for example, the remote device 104 via wireless connecting systems 406*a* and/or 406*b*.

When a WMC device in the WMC mesh network 302 becomes communicatively coupled to an external network, it may send routing scheduling data to the other WMC devices in the WMC mesh network 302 to indicate the availability of external connectivity. The other WMC devices may utilize the routing WMC device to communicate with external entitles such as the remote device 104. The WMC devices in the WMC mesh network 302 may maintain routing information that enable them to determine available routing paths utilizing other WMC devices in the WMC mesh network 302. The WMC devices may update their routing information based on broadcasted routing scheduling data from other WMC devices in the WMC mesh network 302. WMC devices operating as routing nodes for other WMC devices in the WMC mesh network 302 may be enabled to be selective in routing data and/or information. The routing selectivity may utilize various criteria. For example, a WMC device functioning as a routing node in the WMC mesh network 302 may utilize emergency as a criterion in routing selectivity.

Another embodiment of the invention may provide a machine-readable storage, having stored thereon, a computer program having at least one code section executable by a machine, thereby causing the machine to perform the steps as described herein for establishing a connection outside a mesh by including network connectivity information in router configuration messages.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for improving wireless devices, the method comprising:
    establishing a mesh network between or among a plurality of peer-client wireless mobile communication (WMC) devices when said devices are in proximity of each other; and sharing routing scheduling data between or among said plurality of peer-client wireless mobile communication devices in said mesh network to enable forwarding of information between or among said plurality of peer-client wireless mobile communication devices,
    wherein said shared routing scheduling data enables external network communication for said mesh network when one or more of said plurality of peer-client wireless mobile communication devices is communicatively coupled to an external network,
    wherein a peer-client wireless mobile communication device that is currently capable of connecting with the external network broadcasts the routing scheduling data that indicates that the peer-client wireless mobile communication device has external connectivity,
    wherein in response to receiving data from another peer-client wireless mobile communication device in the mesh network targeted towards a destination peer-client wireless mobile communication device in the mesh network, the peer-client wireless mobile communication device forwards the data through the mesh network to the destination peer-client wireless mobile communication device,
    wherein in response to receiving data targeted towards a remote destination device in the external network from another peer-client wireless mobile communication device in the mesh network, the peer-client wireless mobile communication device discards the data unless the data is determined to have sufficient priority for accessing the external network and is therefore forwarded to the external network.

2. The method according to claim 1, comprising updating said routing scheduling data whenever there is a change that impacts routing for one or more of said plurality of peer-client wireless mobile communication devices.

3. The method according to claim 1, comprising updating said routing scheduling data whenever there is a change in connectivity to said external network.

4. The method according to claim 1, wherein said external network comprises a wireless wide area network (WAN).

5. The method according to claim 1, comprising generating routing paths in each of said plurality of peer-client wireless mobile communication devices based on said shared routing scheduling data.

6. The method according to claim 1, wherein each of said plurality of peer-client wireless mobile communication devices comprises capability to resolve access competition during said forwarding of information.

7. The method according to claim 6, comprising resolving said access competition based on priority.

8. The method according to claim 7, wherein said priority is based on corresponding peer-client wireless mobile communication device identity that sent said forwarded information.

9. The method according to claim 7, wherein said priority comprises traffic priority based on type of said forwarded information.

10. The method according to claim 1, wherein each of said plurality of peer-client wireless mobile communication (WMC) devices comprises capability to store forwarded information when none of said plurality of peer-client wireless mobile communication devices is communicatively coupled to the external network.

11. A non-transitory computer readable medium having stored thereon, a computer program having at least one code section for improving wireless devices, the at least one code section being executable by a computer for causing the computer to perform steps comprising:

establishing a mesh network between or among a plurality of peer-client wireless mobile communication (WMC) devices when said devices are in proximity of each other; and sharing routing scheduling data between or among said plurality of peer-client wireless mobile communication devices in said mesh network to enable forwarding of information between or among said plurality of peer-client wireless mobile communication devices, wherein said shared routing scheduling data enables external network communication for said mesh network when one or more of said plurality of peer-client wireless mobile communication devices is communicatively couple to an external network, wherein a peer-client wireless mobile communication device that is currently capable of connecting with the external network broadcasts the routing scheduling data that indicates that the peer-client wireless mobile communication device has external connectivity, wherein in response to receiving data from another peer-client wireless mobile communication device in the mesh network targeted towards a destination peer-client wireless mobile communication device in the mesh network, the peer-client wireless mobile communication device forwards the data through the mesh network to the destination peer-client wireless mobile communication device, wherein in response to receiving data targeted towards a remote destination device in the external network from another peer-client wireless mobile communication device in the mesh network, the peer-client wireless mobile communication device discards the data unless the data is determined to have sufficient priority for accessing the external network and is therefore forwarded to the external network.

12. The non-transitory computer readable medium according to claim 11, comprising updating said routing scheduling data whenever there is a change that impacts routing for one or more of said plurality of peer-client wireless mobile communication devices.

13. The non-transitory computer readable medium according to claim 11, comprising updating said routing scheduling data whenever there is a change in connectivity to said external network.

14. The non-transitory computer readable medium according to claim 11, wherein said external network comprises a wireless wide area network (WAN).

15. The non-transitory computer readable medium according to claim 11, comprising generating routing paths in each of said plurality of peer-client wireless mobile communication devices based on said shared routing scheduling data.

16. The non-transitory computer readable medium according to claim 11, wherein each of said plurality of peer-client wireless mobile communication devices comprises capability to resolve access competition during said forwarding of information.

17. The non-transitory computer readable medium according to claim 16, comprising resolving said access competition based on priority.

18. The non-transitory computer readable medium according to claim 17, wherein said priority is based on corresponding peer-client wireless mobile communication device identity that sent said forwarded information.

19. The non-transitory computer readable medium according to claim 17, wherein said priority comprises traffic priority based on type of said forwarded information.

20. The non-transitory computer readable medium according to claim 11, wherein each of said plurality of peer-client wireless mobile communication devices comprises capability to store forwarded information when none of said plurality of peer-client wireless mobile communication devices is communicatively coupled to the external network.

21. A system for handling data in wireless devices, the system comprising:

one or more processors that enables establishing a mesh network between or among a plurality of peer-client wireless mobile communication (WMC) devices when said devices are in proximity of each other; and said one or more processors enable sharing of routing scheduling data between or among said plurality of peer-client wireless mobile communication devices in said mesh network to enable forwarding of information between or among said plurality of peer-client wireless mobile communication devices, wherein said shared routing scheduling data enables external network communication for said mesh network when one or more of said plurality of peer-client wireless mobile communication devices is communicatively couple to an external network, wherein a peer-client wireless mobile communication device that is currently capable of connecting with the external network broadcasts the routing scheduling data that indicates that the peer-client wireless mobile communication device has external connectivity, wherein in response to receiving data from another peer-client wireless mobile communication device in the mesh network targeted towards a destination peer-client wireless mobile communication device in the mesh network, the peer-client wireless mobile communication device forwards the data through the mesh network to the destination peer-client wireless mobile communication device, wherein in response to receiving data targeted towards a remote destination device in the external network from another peer-client wireless mobile communication device in the mesh network, the peer-client wireless mobile communication device discards the data unless the data is determined to have sufficient priority for accessing the external network and is therefore forwarded to the external network.

22. The system according to claim 21, wherein said one or more processors updates said routing scheduling data whenever there is a change that impacts routing for one or more of said plurality of peer-client wireless mobile communication devices.

23. The system according to claim 21, wherein said one or more processors updates said routing scheduling data whenever there is a change in connectivity to said external network.

24. The system according to claim 21, wherein said external network comprises a wireless wide area network (WAN).

25. The system according to claim 21, wherein said one or more processors generates routing paths in each of said plurality of peer-client wireless mobile communication devices based on said shared routing scheduling data.

26. The system according to claim 21, wherein each of said plurality of peer-client wireless mobile communication devices comprises capability to resolve access competition during said forwarding of information.

27. The system according to claim 26, wherein said one or more processors resolves said access competition based on priority.

28. The system according to claim 27, wherein said priority is based on corresponding peer-client wireless mobile communication device identity that sent said forwarded information.

29. The system according to claim 27, wherein said priority comprises traffic priority based on type of said forwarded information.

30. The system according to claim 21, wherein each of said plurality of peer-client wireless mobile communication devices comprises capability to store forwarded information when none of said plurality of peer-client wireless mobile communication is communicatively coupled to the external network.

* * * * *